United States Patent
Morgan

[11] Patent Number: 5,848,812
[45] Date of Patent: Dec. 15, 1998

[54] MULTI-ADJUSTABLE AIR CONDUIT SYSTEM WITH DIFFERENTIAL SEALING

[75] Inventor: Jeffrey S. Morgan, Stoughton, Wis.

[73] Assignee: Nelson Industries, Inc., Stoughton, Wis.

[21] Appl. No.: 832,412

[22] Filed: Apr. 2, 1997

[51] Int. Cl.⁶ .................................................. F16L 27/00
[52] U.S. Cl. ...................... 285/145.2; 285/181; 285/231; 285/351; 285/906
[58] Field of Search ................... 285/145.2, 230, 285/231, 233, 234, 351, 238, 7, 906

[56] References Cited

U.S. PATENT DOCUMENTS

| | | | |
|---|---|---|---|
| 2,428,143 | 9/1947 | Chavayda | 285/233 |
| 3,215,455 | 11/1965 | Flala et al. | 285/233 |
| 3,794,080 | 2/1974 | Huston et al. | 285/239 X |
| 4,856,826 | 8/1989 | Engel et al. | |
| 4,974,881 | 12/1990 | Engel et al. | |
| 5,106,129 | 4/1992 | Camacho et al. | 285/231 X |
| 5,129,685 | 7/1992 | Engel | |
| 5,137,308 | 8/1992 | Engel et al. | |
| 5,348,051 | 9/1994 | Kallenback | 285/7 X |
| 5,474,337 | 12/1995 | Nepsund et al. | |

FOREIGN PATENT DOCUMENTS 1494669  12/1977  United Kingdom .................. 285/351

*Primary Examiner*—Dave W. Arola
*Attorney, Agent, or Firm*—Andrus, Sceales, Starke & Sawall

[57] ABSTRACT

An air conduit system (10) has a male air tube (22), a plurality of annular gaskets (26, 28, 30) around the male air tube (22), and a female air tube (24) receiving the male air tube (22) and engaging the gaskets (26, 28, 30) in sealing relation. The interface of the tubes is adjustable along three degrees of freedom, including a degree of freedom differentially compressing and expanding different of the gaskets such that one of the gaskets compresses while another expands.

5 Claims, 3 Drawing Sheets

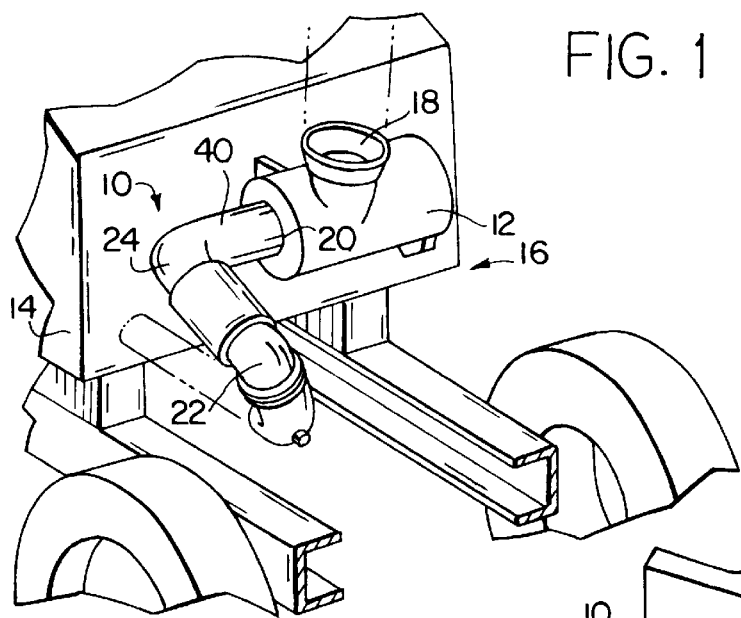
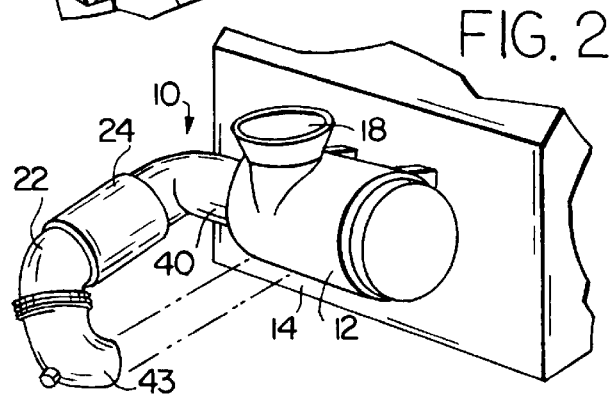
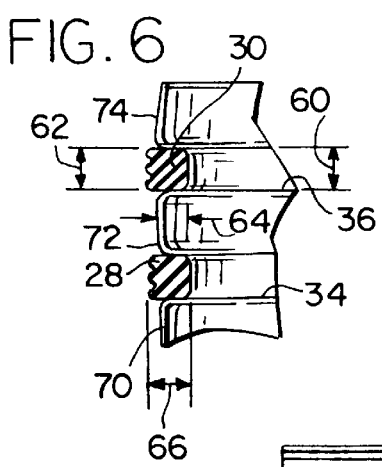
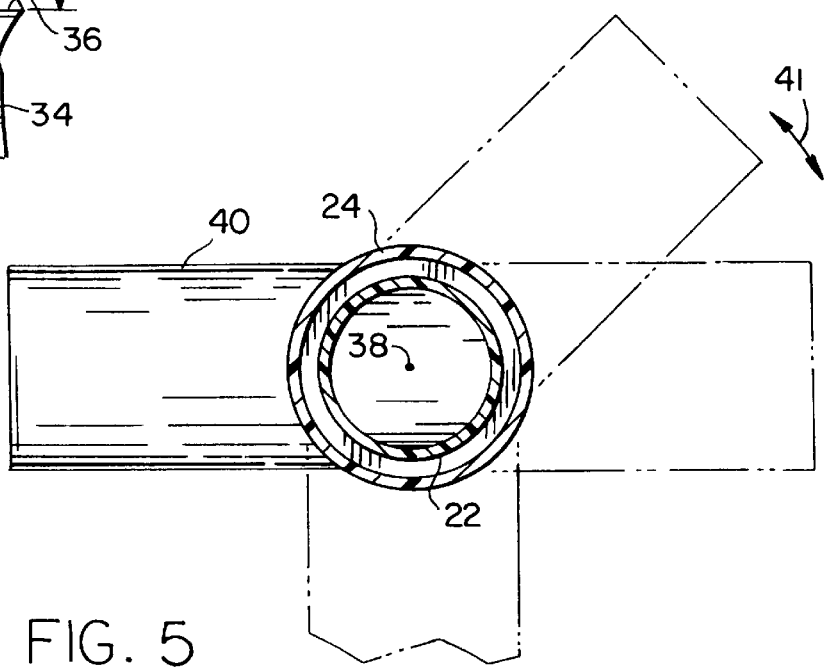

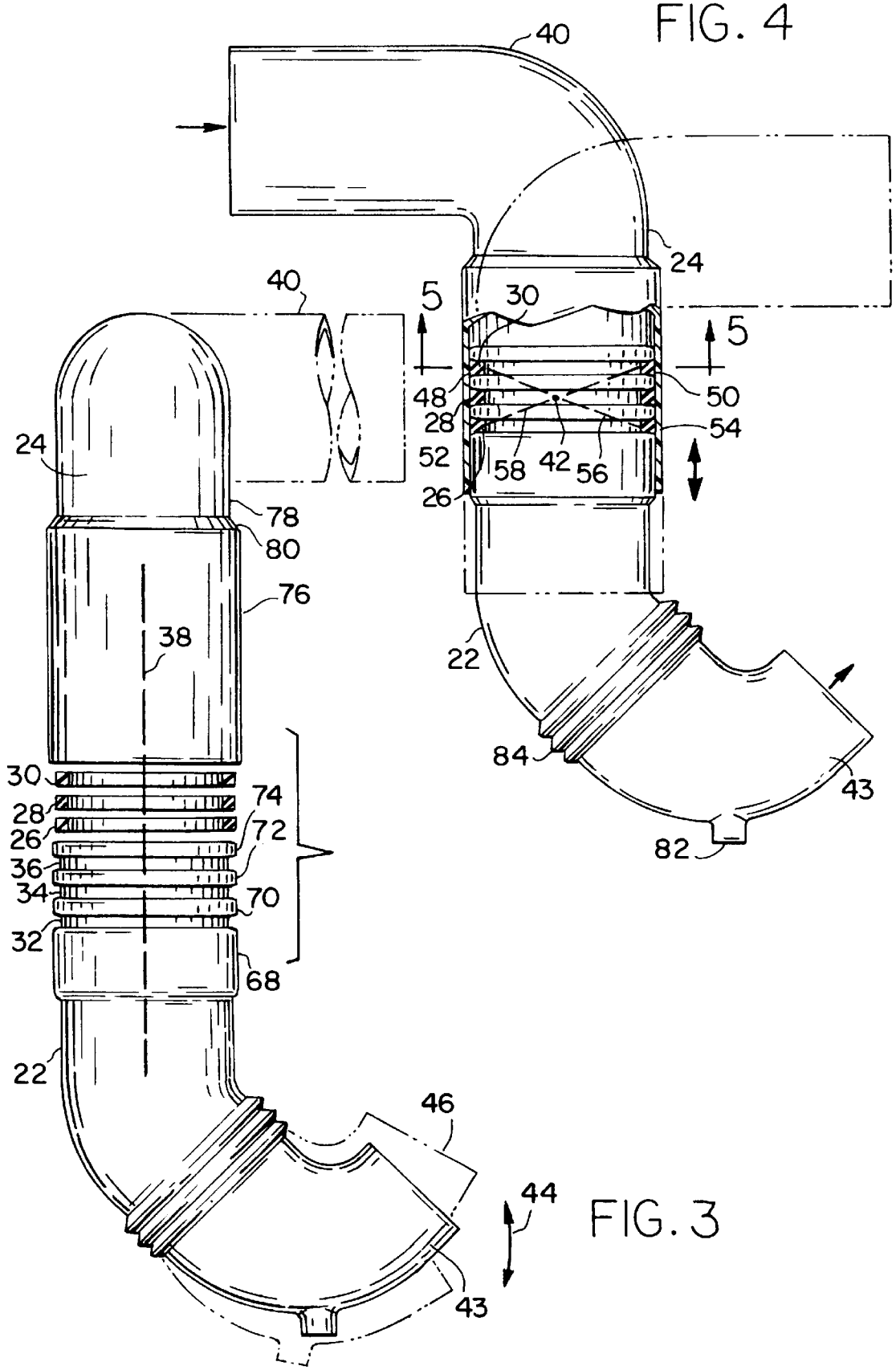

MULTI-ADJUSTABLE AIR CONDUIT SYSTEM WITH DIFFERENTIAL SEALING

BACKGROUND AND SUMMARY

The invention relates to air conduit systems, including the type conducting filtered combustion air from an air filter to an internal combustion engine, such as on a truck.

Air conduit systems of the above type are known in the prior art. In order to accommodate differing structural environments, including different orientations and placements of air filter fittings and engine fittings, it is desirable that the air conduit system therebetween be adjustable in as many degrees of freedom as possible. This facilitates standardized universal application of the air conduit system, minimizing inventory stocking of specialized dedicated parts. In providing the desired adjustability, attention must also be given to maintaining sealed engagement of the various components of the air conduit system in all of the various adjusted positions. The present invention addresses this need, and provides particularly simple and effective structure for satisfying same.

BRIEF DESCRIPTION OF THE DRAWINGS

FIG. 1 is a perspective schematic view of an air conduit system in accordance with the invention.

FIG. 2 is another perspective schematic view of the air conduit system of FIG. 1.

FIG. 3 is an exploded elevational view of the air conduit system of FIG. 1.

FIG. 4 is an assembly view, partially cut away, of the structure of FIG. 3.

FIG. 5 is a sectional view taken along line 5—5 of FIG. 4.

FIG. 6 is an enlarged view of a portion of the structure of FIG. 4.

DETAILED DESCRIPTION

Figure 7:
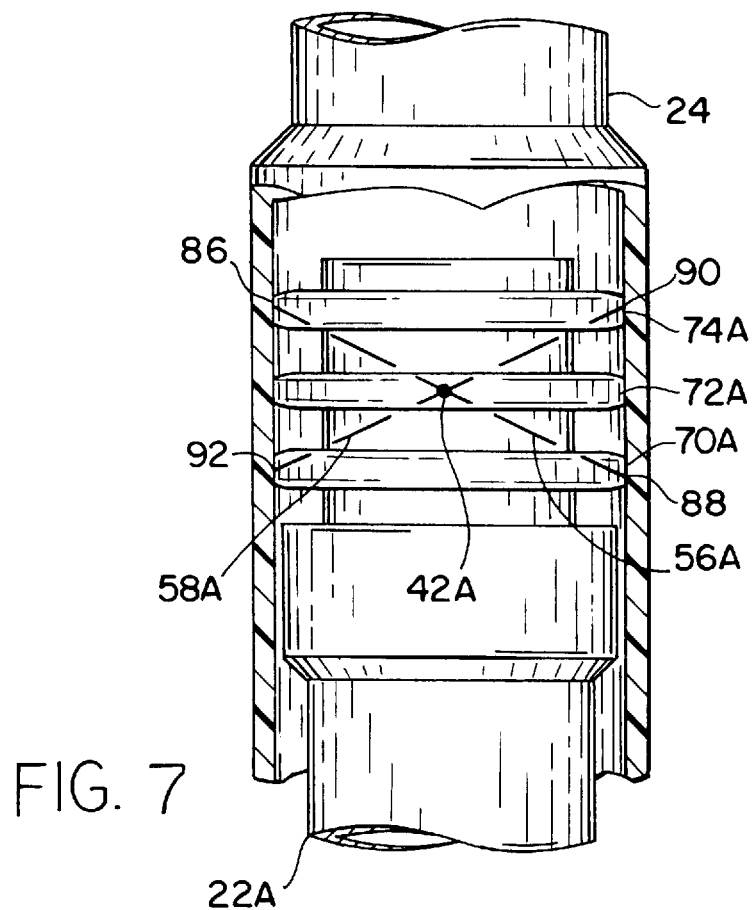
FIG. 7 is an assembly view, partially cut away, of another embodiment of an air conduit system in accordance with the invention.

FIGS. 1 and 2 show an air conduit system 10 for conducting filtered combustion air from an air filter 12 to an internal combustion engine 14 mounted on truck 16. Outside air is drawn into inlet 18 of air filter 12 and then flows through filter outlet 20 and then through air conduit system 10 to the engine.

The air conduit system includes rigid plastic air tubes 22 and 24, FIGS. 3 and 4, engaging each other in telescoping relation at an interface adjustable along three degrees of freedom, to be described. Male air tube 22 has annular rubber gaskets 26, 28, 30 therearound, and female air tube 24 receives male air tube 22 and engages the gaskets in sealing relation.

Male tube 22 has annular grooves 32, 34, 36, FIG. 3, receiving annular gaskets 26, 28, 30, respectively. Male tube 22 is received in female tube 24 in telescoping relation along axis 38, which axis constitutes the first of the noted degrees of freedom. Tubes 22 and 24 are rotatable relative to each other about axis 38, which rotation constitutes the second of the noted degrees of freedom.

Tube 24 has an elbow portion 40 swingable in an arc 41, FIG. 5, in a plane normal to axis 38 upon rotation of tube 24 about axis 38. The noted plane of arc 41 lies in the plane of the page in FIG. 5, and extends perpendicularly into and out of the page in FIGS. 3 and 4. The interface of tubes 22 and 24 is adjustable along a third degree of freedom provided by rocking tube 22 about an axis 42, FIG. 4. Axis 42 is perpendicular to axis 38 and parallel to the plane of arc 41, FIG. 5. In FIG. 4, axis 42 extends perpendicularly into and out of the page. Axis 42 extends through annular gasket 28 and lies in the plane thereof. Axis 42 extends between annular gaskets 26 and 30 and parallel to the planes thereof. Tube 22 is rockable about axis 42, such that the outer end 43 of tube 22 can swing along an arc 44. Arc 44 is perpendicular to arc 41.

Upon rocking of tube 22 along arc 44 to the dashed line position shown at 46 in FIG. 3, left side 48 of gasket 30 is compressed to a smaller radial thickness between tubes 22 and 24, while right side 50 of gasket 30 expands to a greater radial thickness between tubes 22 and 24. Left side 48 of gasket 30 is distally opposite right side 50 of gasket 30. Further during the noted rocking to position 46, left side 52 of gasket 26 expands to a greater radial thickness between tubes 22 and 24, while right side 54 of gasket 26 is compressed to a smaller radial thickness between tubes 22 and 24. Left side 52 of gasket 26 is distally opposite right side 54 of gasket 26. Left side 48 of gasket 30 and left side 52 of gasket 26 are axially spaced from each other along a direction parallel to axis 38 and on opposite sides of the plane containing axis 42 and annular gasket 28. Right side 50 of gasket 30 and right side 54 of gasket 26 are axially spaced from each other along a direction parallel to axis 38 and are on opposite sides of the plane containing axis 42 and annular gasket 28. Left side 48 of gasket 30 and right side 54 of gasket 26 are colinear along a line 56 intersecting axis 42. Right side 50 of gasket 30 and left side 52 of gasket 26 are colinear along a line 58 intersecting axis 42. Lines 56 and 58 are oblique relative to each other and to the plane containing axis 42 and annular gasket 28. Upon the noted rocking along arc 44 about axis 42 providing the noted third degree of freedom, the expansion of left side 52 of gasket 26 is compensated by the compression of left side 48 of gasket 30, and the expansion of right side 50 of gasket 30 is compensated by the compression of right side 54 of gasket 26, to maintain sealed engagement of tubes 22 and 24 in the noted third degree of freedom.

Annular gasket 28 is between gaskets 26 and 30 and defines the noted plane containing axis 42. The radial thickness of gasket 28 is less affected than that of gaskets 26 and 30 during the noted rocking along arc 44 about axis 42. This further maintains the sealed engagement of tubes 22 and 24 in the noted third degree of freedom. Gaskets 26 and 30 are equally spaced on opposite sides of gasket 28 along axis 38.

As above described, the interface of tubes 22 and 24 is adjustable along a given degree of freedom, as shown at arc 44 about axis 42, differentially compressing and expanding 10 gaskets 26 and 30 such that one of the gaskets compresses while the other gasket expands.

The given degree of freedom respectively compresses and expands distally opposite sides of different of the gaskets.

Male air tube 22 has the noted annular grooves 32, 34, 36, each receiving a respective annular gasket 26, 28, 30. Each groove has an axial width 60, FIG. 6, along axis 38 substantially the same as the axial width 62 of the respective gasket. Each groove has a radial depth 64 less than the radial height 66 of the respective gasket. Male air tube 22 has an enlarged outer diameter end section 68, FIG. 3, including a plurality of annular lands 70, 72, 74 defining grooves 32, 34, 36, respectively, therebetween. Female air tube 24 has an end section 76 of enlarged outer and inner diameter. The inner diameter of end section 76 of female air tube 24 is greater than the outer diameter of end section 68 of male air tube 22 by an amount such that the radial gap therebetween is less than the difference between radial depth 64 of the grooves and radial height 66 of the gaskets when end sections 68 and 76 are co-linearly aligned along axis 38. Distally opposite sides of different of lands 70 and 74 engage the inner diameter sidewall of end section 76 of female air tube 24 and limit movement along the noted third degree of freedom, namely a Female air tube 24 has a central section 78, FIG. 3, of smaller inner diameter than end section 76, and has a transition section 80 from central section 78 to end section 76.

Land 74 of male air tube 22 engages transition section 80 upon telescoping insertion of male air tube 22 along axis 38 into female air tube 24 to stop such insertion and limit movement along the noted first degree of freedom.

Male air tube 22 may be provided with a fresh air outlet 82, for example for connection to the air brake compressor. Male air tube 22 may also be provided with bellows 84 formed in the sidewall, to further enhance mounting flexibility. Alternatively, similar bellows may be provided in female air tube 24 to enhance mounting flexibility.

An alternative embodiment of the invention which eliminates the need for the annular rubber gaskets 26, 28, and 30 is illustrated in FIG. 7. In FIG. 7, the male air tube 22a has been modified by enlarging the outside diameter of the lands 70a, 72a and 74a to provide an interference fit between the lands 70a, 72a and 74a and the inside surface of the female air tube 24a. In this embodiment, the male air tube 22a and in particular the annular lands 70a, 72a and 74a are made of an elastomeric rubber like material, such as but not limited to a thermoplastic rubber. In FIG. 7, the need for rubber gaskets 26, 28, and 30 is eliminated because the female air tube 24 receives the male air tube 22a and engages the lands 70a, 72a and 74a in sealing relation.

The interface of tubes 22a and 24 is adjustable along a third degree of freedom provided by rocking tube 22a about an axis 42a, FIG. 7. In FIG. 4, axis 42a extends perpendicularly into and out of the page. Axis 42a extends through annular land 72a and lies in the plane thereof. Axis 42a extends between annular lands 70a and 74a in parallel to the planes thereof. Tube 22a is rockable about axis 42a, such that the outer end of tube 22a can swing along an arc similar to arc 44 shown in FIG. 3. A left side 86 of land 74a and a right side 88 of land 70a are colinear along line 56a intersecting axis 42a. A right side 90 of annular land 74a and a left side 92 of annular land 70a are colinear along line 58a intersecting axis 42a. Lines 56a and 58a are oblique relative to each other and to the plane containing axis 42a and annular land 72a. Upon rocking about axis 42a providing the noted third degree of freedom, the expansion of the left side 92 of annular land 70a is compensated by the compression of the left side 86 of annular land 74a, and the expansion of the right side 90 of annular land 74 is compensated by the compression of the right side 88 of annular land 70a to maintain sealed engagement of tubes 22a and 24 in the noted third degree of freedom. In other aspects, the embodiment of the invention shown in FIG. 7 is preferably the same or similar to the embodiment of the invention shown in FIGS. 1–6.

It is recognized that various equivalents, alternatives and modifications are possible within the scope of the appended claims.

I claim:

1. An air conduit system comprising a male air tube, a plurality of annular gaskets around said male air tube, a female air tube receiving said male air tube and engaging said gaskets in sealing relation, the interface of said tubes being adjustable along a given degree of freedom differentially compressing and expanding said gaskets such that one of said gaskets compresses while another of said gaskets expands, wherein said given degree of freedom respectively compresses and expands distally opposite sides of different of said gaskets, wherein said tubes engage in telescoping relation, and said interface is adjustable along three degrees of freedom, including said given degree, comprising a first degree of freedom along a first axis which is the axis of said telescoping, a second degree of freedom which is rotation of at least one of said tubes about said first axis, and a third degree of freedom provided by rocking of one of said tubes along an arc about a second axis perpendicular to said first axis, said third degree of freedom being said given degree of freedom, and wherein said male air tube has a plurality of annular grooves each receiving a respective said annular gasket, each groove having an axial width along said first axis substantially the same as the axial width of the respective said gasket, and wherein said male air tube has an enlarged outer diameter end section including a plurality of annular lands defining said grooves therebetween, said female air tube has an end section of enlarged outer and inner diameter, said inner diameter of said end section of said female air tube being greater than said outer diameter of said end section of said male air tube by an amount such that the radial gap therebetween is less than the difference between said radial depth of said groove and said radial height of said gasket when said end sections are collaterally aligned along said first axis.

2. The invention according to claim 1 wherein distally opposite sides of different of said lands engage the inner diameter sidewall of said end section of said female air tube and limit movement along said third degree of freedom.

3. The invention according to claim 2 wherein said female air tube has a central section of smaller inner diameter than said end section of said female air tube, and has a transition section from said central section to said end section, and wherein one of said lands engages said transition section upon telescoping insertion of said male air tube into said female air tube to stop said insertion and limit movement along said first degree of freedom.

4. An air conduit system comprising first and second air tubes engaging each other in telescoping relation at an interface adjustable along three degrees of freedom, comprising a male air tube, and a female air tube receiving said male air tube, said male air tube having three annular grooves, and comprising three annular gaskets, each received in a respective one of said annular grooves and each defining a respective first, second and third annular plane, and wherein said male air tube is received in said female air tube in telescoping relation along a first axis constituting the first of said degrees of freedom and said gaskets are in sealing engagement with said tubes, said tubes being rotatable relative to each other about said first axis, which rotation constitutes the second of said degrees of freedom, and wherein the interface of said tubes is adjustable along a third degree of freedom provided by rocking one of said tubes about a second axis perpendicular to said first axis and lying in said second annular plane, said second axis extending between said first and third annular planes and parallel to each such that upon rocking about said second axis, a first side of said first gasket is compressed to a smaller radial thickness between said tubes while a second side of said first gasket expands to a greater radial thickness between said tubes, said first side of said first gasket being distally opposite said second side of said first gasket, and such that upon said rocking about said second axis, a first side of said third gasket expands to a greater radial thickness between said tubes while a second side of said third gasket is compressed to a smaller radial thickness between said tubes, said first side of said third gasket being distally opposite said second side of said third gasket, said first side of said first gasket and said first side of said third gasket being axially spaced from each other along a direction parallel to said first axis and on opposite sides of said second annular plane containing said second axis, said second side of said first gasket and said second side of said third gasket being axially spaced from each other along a direction parallel to said first axis and on opposite sides of said second annular plane containing said second axis, and wherein said first side of said first gasket and said second side of said third gasket are colinear along a first line intersecting said second axis, said second side of said first gasket and said first side of said third gasket are colinear along a second line intersecting said second axis, said first and second lines are oblique relative to each other and to said second annular plane, and wherein the radial thickness of said second gasket is less affected than that of said first and third gaskets during said rocking, to further maintain said sealed engagement of said tubes in said third degree of freedom.

5. An air conduit system comprising first and second air tubes engaging each other in telescoping relation at an interface adjustable along three degrees of freedom, comprising a male air tube, and a female air tube receiving said male air tube, said male air tube having first, second and third annular lands separated by respective annular grooves, said first, second and third annular lands defining respective first, second and third annular planes, wherein said male air tube is received in said female air tube in telescoping relation along a first axis constituting the first of said degrees of freedomand said lands are in sealing engagement with said female tube, said tubes being rotatable relative to each other about said first axis, which rotation constitutes the second of said degrees of freedom, and wherein the interface of said tubes is adjustable along a third degree of freedom provided by rocking one of said tubes about a second axis perpendicular to said first axis and lying in said second annular plane, such that upon rocking about said second axis, a first side of a first said lands is compressed to a smaller radial thickness between said tubes while a second side of said first land expands to a greater radial thickness between said tubes, said first side of said first land being distally opposite said second side of said first land, and such that upon said rocking about said second axis, a first side of said third land expands to a greater radial thickness between said tubes while a second side of said third land is compressed to a smaller radial thickness between said tubes, said first side of said third land being distallyopposite said second side of said third land, said first side of said first land and said first side of said third land being axially spaced from each other along a direction parallel to said first axis and on opposite sides of said second annular plane, said second side of said said first land and said second side of said third land being axially spaced from each other along a direction parallel to said first axis and on opposite sides of said second annular plane, wherein said first side of said first land and said second side of said third land are colinear along a first line intersecting said second axis, said second side of said first land and said first side of said third land are colinear along a second line intersecting said second axis, said first and second lines are oblique relative to each other and to said second annular plane, and wherein the radial thickness of said second land is less affected than that of said first and third lands during said rocking, to further maintain said sealed engagement of said tubes in said third degree of freedom.

* * * * *